UNITED STATES PATENT OFFICE.

SEYMOUR S. WHITE AND JOHN H. STRONG, OF WADENA, MINNESOTA.

PROCESS OF RENOVATING BUTTER.

No. 797,481.     Specification of Letters Patent.     Patented Aug. 15, 1905.

Application filed May 10, 1905. Serial No. 259,824.

*To all whom it may concern:*

Be it known that we, SEYMOUR S. WHITE and JOHN H. STRONG, citizens of the United States, residing at Wadena, in the county of Wadena and State of Minnesota, have invented certain new and useful Improvements in Processes of Renovating Butter, of which the following is a specification.

Our invention relates to improvements in the process of renovating butter and producing a factory ladle butter.

The object of our invention is to provide a process for renovating butter which has become deteriorated by exposure or age or which was improperly made or contains other impure fatty materials in which the same may be rendered permanently sweet and wholesome by simply washing with water at a certain temperature and reworking it with fresh milk, cream, buttermilk, or ripened milk without the use of chemicals or other injurious materials. The process by which this result is attained is described as follows: The butter to be treated is first placed in large troughs made of wood or metal, and the butter is chopped and crumbled into small bits by wooden paddles or by any other means. The butter in said condition is distributed in the tanks or vats and is heated to a temperature of about 85° Fahrenheit. The heating of the butter is preferably accomplished by washing in either fresh or salt warm water, the same being at such a temperature as to bring the butter in a soft condition, preferably likened to a pasty substance. While in this state as many washings of water are used as may be necessary to carry off all the impurities, it being understood that each washing of water is at such a temperature that the butter is kept in the pasty condition. The butter after a sufficient washing and while still in the pasty condition may be colored and salted, grained, worked, and tubbed; but the butter after being washed and is still in the pasty condition is preferably treated with milk or buttermilk, so as to impart thereto the true butter flavor, and this may be accomplished by thoroughly working with paddles or in any other way desired. The milk, buttermilk, cream, or ripened milk is preferably treated with the pasteurization process before it is worked into the butter, whereby offensive gases or flavors are removed from the milk, buttermilk, cream, or ripened milk. The butter is worked with the milk or buttermilk while warm, so that the butter is kept in the pasty state until the desired flavor is obtained. While still in this pasty state we add the butter-coloring and mix the same thoroughly in the butter and also add a dairy-salt and work the same thoroughly through the butter. The butter still being in this pasty state, we then add about five per cent. of the entire bulk of fresh water at a temperature of about 40° Fahrenheit, which gives the butter a grain and causes the same to retain the proper consistency of moisture.

Having thus described our invention, what we claim, and desire to secure by Letters Patent, is—

1. The process of renovating butter, which consists in heating the butter to a temperature of about 85° Fahrenheit, washing the same in either fresh or brine water, and keeping the same at said temperature, working the same over with milk, buttermilk, cream, or ripened milk.

2. The process of renovating butter, which consists in heating the butter to a temperature of about 85° Fahrenheit, washing the same the desired number of times with fresh or brine water, keeping the butter at the same temperature, working the butter with milk, buttermilk, cream or ripened milk, adding the salt and coloring and working the same thoroughly into the butter, and adding a small per cent. of cold water for graining the butter and causing it to retain the proper consistency of moisture.

3. The process of renovating butter, consisting in heating the butter to a temperature of about 85° Fahrenheit, washing the same the desired number of times with fresh or brine water, keeping the butter at the same temperature, working the butter with milk, buttermilk, cream or ripened milk, working the salt and coloring therein, and adding about five per cent. of water at a temperature of about 40° Fahrenheit.

4. The process of renovating butter, consisting in heating the butter to a temperature of about 85° Fahrenheit, washing the same the desired number of times with fresh or brine water, keeping the butter at the same temperature of 85° Fahrenheit, working the butter with the milk, buttermilk, cream or ripened milk, adding the salt and coloring and thoroughly working the same through the butter, and adding about five per cent. of water at a temperature of about 40° whereby the butter is grained and causes it to retain the proper consistency of moisture.

5. The process of renovating butter, consisting in removing the impurities by washing with warm water to bring the butter to a pasty state, and working the same with warm milk, buttermilk, cream or ripened milk.

6. The process of renovating butter, consisting in removing the impurities by washing with warm water to bring the butter to a pasty state, working the same with warm milk, buttermilk, cream, or ripened milk, working the coloring and salt therein while in a pasty state, and adding about five per cent. of water at a temperature of about 40° Fahrenheit, whereby the butter is grained and retains the proper consistency of moisture.

7. The process of renovating butter, consisting of eliminating the impurities by washing with warm water to bring the butter to a pasty state, and working the same with warm milk, buttermilk, cream, or ripened milk, of a temperature to keep the butter in said pasty state, working the coloring and salt therein while in said pasty state, and adding about five per cent. of cold water whereby the butter is grained and retains the proper consistency of moisture.

8. The process of renovating butter, consisting in removing the impurities by washing in warm water of a temperature to bring the butter to a pasty state at a temperature of about 85° Fahrenheit, working the same with milk of a temperature to keep the butter at said 85°, working the coloring and salt therein while at said temperature, and adding about five per cent. of water at a temperature of about 40° Fahrenheit whereby the butter is grained and retains the proper consistency of moisture.

9. The process of renovating butter, consisting in first separating the butter into pieces by any means and removing the impurities by washing with warm water of a temperature to bring the butter to a pasty state at a temperature of about 85° Fahrenheit, any desired number of washings being used, working the same with milk at a temperature to keep the butter at said 85°, working the coloring and salt therein while at said temperature, and adding about five per cent. of water at a temperature of about 40° Fahrenheit whereby the butter is grained and retains the proper consistency of moisture.

In testimony whereof we affix our signatures in presence of two witnesses.

SEYMOUR S. WHITE.
JOHN H. STRONG.

Witnesses:
A. BLANCHE HESLOP,
F. F. LATTA.